United States Patent [19]

Meguro et al.

[11] 3,846,421
[45] Nov. 5, 1974

[54] TRIAZOLOBENZODIAZEPINE DERIVATIVES

[75] Inventors: Kanji Meguro; Yutaka Kuwada, both of Hyogo, Japan

[73] Assignee: Takeda Chemical Industries, Ltd., Higashii-ku, Osaka, Japan

[22] Filed: Aug. 20, 1971

[21] Appl. No.: 173,634

[30] Foreign Application Priority Data
Sept. 26, 1970 Japan................................. 45-74749

[52] U.S. Cl. 260/247.2 A, 260/239 BD, 260/268 TR, 260/293.59, 260/308 C, 424/248, 424/250, 424/267, 424/269
[51] Int. Cl. ...................... C07d 57/02, C07d 99/02
[58] Field of Search.... 260/308 C, 247.2 A, 293.59, 260/268 TR

[56] References Cited
UNITED STATES PATENTS

| | | | |
|---|---|---|---|
| 3,201,404 | 8/1965 | Ruschig et al. | 260/308 C |
| 3,514,466 | 5/1970 | Stähle et al. | 260/308 C |
| 3,646,055 | 2/1972 | Hester | 260/308 C |

*Primary Examiner*—Alton D. Rollins
*Attorney, Agent, or Firm*—Wenderoth, Lind & Ponack

[57] ABSTRACT
Compounds of the formula

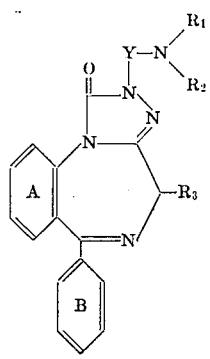

wherein Y represents alkylene having up to six carbons, $R_1$ represents hydrogen or lower alkyl, $R_2$ represents lower alkyl, or $R_1$ and $R_2$, together with the adjacent nitrogen, form a five or six membered ring, $R_3$ represents hydrogen or alkyl having up to six carbons and each of the rings A and B is unsubstituted or has one or more substituents selected from the group consisting of nitro, trifluoromethyl, halogen, lower alkyl and lower alkoxy, 5- position N-oxides thereof and pharmaceutically acceptable acid salts thereof are useful as tranquilizer, muscle relaxant, anticonvulsant, sedative and sleep inducer agents. The compounds are prepared by alkylating a compound of the formula

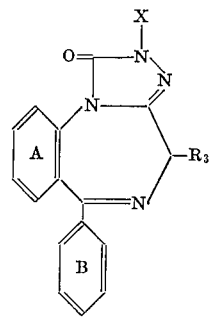

wherein X represents hydrogen or alkali metal with a compound of the formula

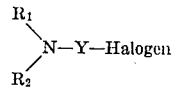

15 Claims, No Drawings

TRIAZOLOBENZODIAZEPINE DERIVATIVES

This invention relates to novel and pharmaceutically useful triazolobenzodiazepine derivatives of the formula

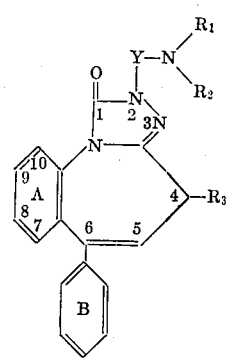

(I)

wherein Y represents alkylene having up to six carbons, $R_1$ represents hydrogen or lower alkyl, $R_2$ represents lower alkyl, or $R_1$ and $R_2$, together with the adjacent nitrogen, form a five or six membered ring, $R_3$ represents hydrogen or alkyl having up to six carbons and each of the rings A and B is unsubstituted or has one or more substituents selected from the group consisting of nitro, trifluoromethyl, halogen, lower alkyl and lower alkoxy, the corresponding 5-position N-oxides and pharmaceutically acceptable acid salts thereof, and a method of producing them.

Referring to the formula (I), alkylene represented by Y can be straight or branched chain and is preferably exemplified by ethylene, trimethylene, propylene, tetramethylene, pentamethylene and hexamethylene. Lower alkyl represented by $R_1$ or $R_2$ can be the same or different and is exemplified by methyl, ethyl, propyl or isopropyl.

The five or six membered ring formed by $R_1$, $R_2$ with their adjacent nitrogen can contain other hetero atom(s), and is exemplified by pyrrolidine, piperidine, morpholine, piperazine and N-lower alkyl (e.g., methyl, ethyl and propyl) piperazine. Alkyl having up to six carbons represented by $R_3$ can, for example, be methyl, ethyl, propyl, isopropyl, butyl, isobutyl, sec-butyl, tert-butyl, amyl and hexyl.

Halogen which can be attached as substituent(s) to each of the rings A and B includes any one of chlorine, bromine, iodine and fluorine. The lower alkyl which can be attached as substituent(s) to each of the rings A and B can be one having up to three carbons, such as methyl, ethyl, propyl and isopropyl.

The lower alkoxy which can be attached as substituent(s) to each of the rings A and B can be one having up to three carbons such as methoxy, ethoxy, propoxy and isopropoxy.

When used herein the term "compounds (I)" is intended to mean the compounds of formula (I) as well as the corresponding 5-position N-oxides thereof.

Principal object of the present invention is to provide the novel compounds (I) and their pharmaceutically acceptable acid salts, which are useful as tranquilizer, muscle relaxant, anticonvulsant, sedative and sleep inducer agents.

Another object of the present invention is to provide a novel and useful process for production of the compounds (I) and their pharmaceutically acceptable acid salts.

The compounds (I) of the present invention can be prepared by a process which comprises alkylating a compound of the formula

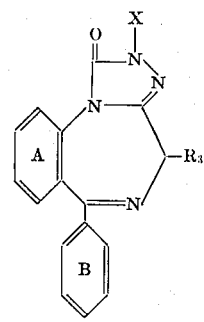

(II)

wherein X represents hydrogen or alkali metal and the other symbols have the meaning given above or the corresponding 5-position N-oxide thereof with a compound of the formula

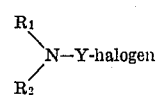

(III)

wherein halogen represents chlorine, bromine and iodine and the other symbols have the meaning given above.

The starting material (II) can be prepared, for instance, by the process outlined below:

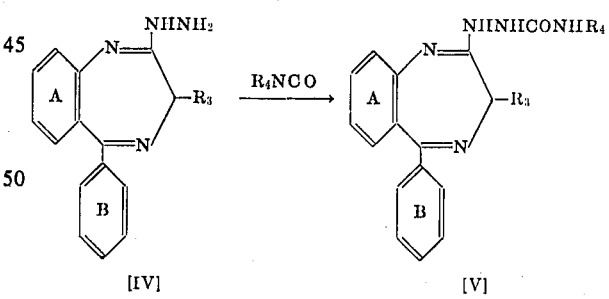

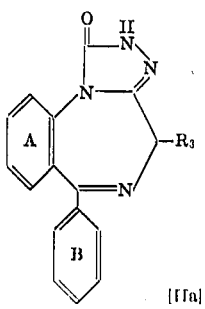

[IIa]

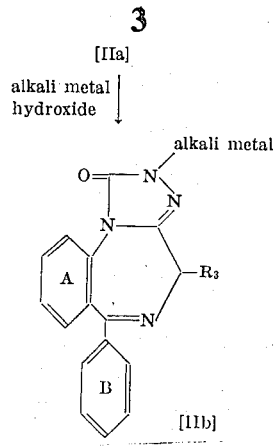

wherein $R_4$ represents alkyl (e.g., methyl and ethyl), and other symbols have the meaning given above and the nitrogen at the 4-position of the compounds (IV) and (V) and at the 5-position of the compounds $(II_a)$ and $(II_b)$ may form the N-oxide.

In the process of the present invention, the compound (II) is allowed to react with the compound (III).

The amount of the compound III employed is, for practical purposes, from about 1 to about 5 moles per mole of the compound (II).

The present reaction can be conducted at s suitable temperature of from about 0° C to about 100° C and is generally conducted in a range from about 20° C to about 70° C.

The present reaction is generally conducted in the presence of a suitable solvent such as aromatic hydrocarbon (e.g., benzene, toluene and xylene), dimethylformamide and dimethyl sulfoxide.

In the present process, the starting compound (II) wherein X is alkali metal is more reactive than the compound (II) wherein X is hydrogen. Therefore, when the compound (II) wherein X is hydrogen is employed as the starting material, it is recommended to conduct the present process after converting it to the compound (II) wherein X is alkali metal using alkali metal hydroxide (e.g. sodium hydroxide and potassium hydroxide), alkali metal alkoxide (e.g. sodium methoxide, sodium ethoxide and potassium butoxide), alkali metal amide (e.g. sodium amide and potassium amide) or alkali metal hydride (e.g. sodium hydride and lithium hydride), or to conduct the reaction in the presence of the above mentioned reagent.

The compounds (I) prepared above can be converted to their pharmaceutically acceptable acid salts by per se conventional means. The acid usable for the preparation of the acid salt of the compound (I) may be an inorganic acid (e.g. hydrochloric acid and sulfuric acid) or an organic acid (e.g. oxalic acid, malonic acid, succinic acid, maleic acid, fumaric acid, tartaric acid, malic acid and palmitic acid).

The compounds (I) and their acid salts prepared above can easily be isolated in optional purity from the resulting mixture by per se conventional separation and purification means such as evaporation, extraction and recrystallization.

The compounds (I) and their pharmaceutically acceptable acid salts show tranquilizing, muscle relaxing, anticonvulsive, sedative and sleep inducing effects. Therefore, these compounds and their pharmaceutically acceptable acid salts can be used effectively and safely as tranquilizer, muscle relaxant, anticonvulsant, sedative and sleep inducer agents.

The objective compounds of the present invention can be administered as they are or in a form of a suitable pharmaceutical composition such as powder, granules, tablets and injection prepared with the use of pharmaceutically acceptable carrier or adjuvant.

Most of the pharmaceutically acceptable acid salts of the objective compounds (I) are water soluble and can advantageously be used in a form of injection or solution.

Although dosage of the objective compound varies with the kinds of the compounds, symptom of diseases, etc., usual dosage is in the range from about 1 to about 30 mg/day for an adult human.

REFERENCE 1

To a solution of 14.2 g. of 7-chloro-2-hydrazino-5-phenyl-3H-1,4-benzodiazepine in 250 ml. of tetrahydrofuran is added dropwise 3.5 ml. of methyl isocyanate with stirring under ice-cooling. After 1 hour's stirring, the mixture is poured into 2 liters of water. The resulting precipitates are collected by filtration, washed with water and acetone, and dried, whereby 7-chloro-2-(4-methylsemicarbazido)-5-phenyl-3H-1,4-benzodiazepine is yielded as crystals. Recrystallization from dimethylformamide-water gives white needles melting at 247° C (decomposition).

A mixture of 5.1 g. of 7-chloro-2-(4-methylsemicarbazido)-5-phenyl-3H-1,4-benzodiazepine and 180 ml. of pyridine is refluxed for 35 hours until the generation of methylamine ceases. The solvent is distilled off under reduced pressure and the residue is treated with ethyl acetate, whereby 8-chloro-6-phenyl-2,4-dihydro-1H-s-triazolo [4,3-a][1,4]benzodiazepin-1-one is yielded as crystals. Recrystallization from methanol gives colorless needles melting at 252°–253° C.

REFERENCE 2

To a solution of 3 g. of 7-chloro-2-hydrazino-5-phenyl-3H-1,4-benzodiazepine 4N-oxide in 60 ml. of pyridine is added 0.7 ml. of methyl isocyanate under ice-cooling, and the mixture is stirred for 30 minutes. The resulting precipitates are collected by filtration, washed with methanol and dried, whereby 7-chloro-2-(4-methylsemicarbazido)-5-phenyl-3H-1,4-benzodiazepine 4N-oxide is yielded as crystals. Recrystallization from dimethylformamide-water gives colorless fine needles melting at 251°–252° C (decomposition).

A solution of 3 g. of 7-chloro-2-(4-methylsemicarbazido)-5-phenyl-3H-1,4-benzodiazepine 4N-oxide in a mixture of 60 ml. of pyridine and 140 ml. of dimethylformamide is refluxed for 8.5 hours. The solvent is removed by distillation under reduced pressure. The residue is treated with aqueous ethanol, whereby 8-chloro-6-phenyl-2,4-dihydro-1H-s-triazolo[4,3-a][1,4]benzodiazepin-1-one 5N-oxide is yielded as crystals. Recrystallization from methanol gives 8-chloro-6-phenyl-2,4-dihydro-1H-s-triazolo[4,3-a][1,4]-benzodiazepin-1-one 5N-oxide monomethanolate as yellow prisms melting at 164°–166° C(foaming). Recrystallization from aqueous ethanol yields 8-chloro-6-phenyl-2,4-dihydro-1H-s-triazolo[4,3-a][1,4]benzodiazepin-1-one 5N-oxide monohydrate as yellow prisms melting at 173°–174° C(softening).

The following starting materials can be produced in a similar manner to that described in Reference 1 or 2.

8-Chloro-6-(4-methoxyphenyl)-2,4-dihydro-1H-s-triazolo-[4,3-a][1,4]benzodiazepin-1-one; colorless needles from methanol, melting point 257°–258° C.
6-Phenyl-2,4-dihydro-1H-s-triazolo[4,3-a][1,4]benzodiazepin-1-one; colorless needles from methanol, melting point 236°–237° C.
8-Methyl-6-phenyl-2,4-dihydro-1H-s-triazolo[4,3-a][1,4]-benzodiazepin-1-one; colorless prisms from methanol, melting point 242°–244° C.
8-Chloro-6-(4-chlorophenyl)-2,4-dihydro-1H-s-triazolo[4,3-a][1,4]benzodiazepin-1-one 5N-oxide; colorless prisms from methanol, melting point 188°–190° C.
8-Nitro-6-phenyl-2,4-dihydro-1H-s-triazolo[4,3-a][1,4]-benzodiazepin-1-one 5N-oxide; yellow prisms from acetone-ethyl acetate, melting point 208°–210° C.

6-Phenyl-8-trifluoromethyl-2,4-dihydro-1H-s-triazolo[4,3-a]-[1,4]benzodiazepin-1-one 5N-oxide; colorless prisms from acetone-n-hexane, melting point 171°–173° C (sinter).

EXAMPLE 1

To a solution of 1.55 g. of 8-chloro-6-phenyl-2,4-dihydro-1H-s-triazolo[4,3-a][1,4]benzodiazepin-1-one in 30 ml. of dimethylformamide is added 5 ml. of 2N-aqueous sodium hydroxide, solution, and the mixture is stirred for 15 minutes. To the mixture is added a dimethylaminoethyl chloride solution in toluene (prepared by extracting a mixture of 2.9 g. of dimethylaminoethyl chloride hydrochloride and 10 ml. of 5N-aqueous sodium hydroxide with 10 ml. of toluene, followed by drying over sodium sulfate) and the whole mixture is heated at 60° C for 1 hour. 100 Ml. of water is added thereto, followed by extraction with ether. Ether layer is washed with water and dried over sodium sulfate. Evaporation of the solvent gives 8-chloro-2-(2-dimethylaminoethyl)-6-phenyl-2,4-dihydro-1H-s-triazolo[4,3-a][1,4]-benzodiazepin-1-one as pale yellow oily product. The product is dissolved in 10 ml. of ethanol, followed by addition of a solution of oxalic acid in ethanol, whereby oxalic acid salt of 8-chloro-2-(2-dimethylaminoethyl)-6-phenyl-2,4-dihydro-1H-s-triazolo[4,3-a][1,4]benzodiazepin-1-one is yielded as crystals. Recrystallization from ethanol gives pale yellow plates melting at 161°–162.5° C (effervescence).

Elementary analysis
Calculated for $C_{20}H_{20}N_5O \cdot 3/2(COOH)_2 \cdot \frac{1}{2}h_2O$
    C 52.52 H 4.60 N 13.32
Found    C 52.25 H 4.52 N 13.18

EXAMPLE 2

To a solution of 6.2 g. of 8-chloro-6-phenyl-2,4-dihydro-1H-s-triazolo[4,3-a][1,4]benzodiazepin-1-one in 120 ml. of dimethylformamide is added 10 ml. of 5N aqueous solution of sodium hydroxide, and the mixture is stirred for 10 minutes. To the mixture is added a dimethylaminopropyl chloride solution in toluene (prepared by extracting a mixture of 13 g. of dimethylaminopropyl chloride hydrochloride and 40 ml. of 5N aqueous sodium hydroxide with 40 ml. of toluene, followed by drying over sodium sulfate) and the whole mixture is heated at 60° C for 2 hours on a water bath. 300 Ml. of water is added thereto, followed by extraction with ether. Ether layer is washed with water and dried over sodium sulfate. Evaporation of the solvent gives 8-chloro-2-(3-dimethylaminopropyl)-6-phenyl-2,4-dihydro-1H-s-triazolo[4,3-a][1,4]benzodiazepin-1-one as oily product. The product is dissolved in 20 ml. of ethanol, followed by addition of a solution of oxalic acid in ethanol. The mixture is left standing, whereby oxalic acid salt of 8-chloro-2-(3-dimethylaminopropyl)-6-phenyl-2,4-dihydro-1H-s-triazolo[4,3-a][1,4]benzodiazepin-1-one is yielded as crystals. Recrystallization from methanol-ethanol gives pale yellow powder crystals melting at 163°–166° C (softening) and 171°–173° C (effervescence).

Elementary analysis
Calculated for $C_{21}H_{22}ClN_5O \cdot 3/2(COOH)_2 \cdot \frac{1}{2}H_2O$
    C 53.8 H 4.85 N 12.97
Found    C 53.51 H 5.05 N 13.12

The following compounds are prepared in a similar manner to that described in Example 1 and 2.

8-Chloro-2-(2-diisopropylaminoethyl)-6-phenyl-2,4-dihydro-1H-s-triazolo[4,3-a][1,4]benzodiazepin-1-one;

Colorless needles from aqueous ethanol
Melting point 118.5–119.5°C
Elementary analysis
Calculated for $C_{24}H_{28}ClN_5O$
    C 65.81 H 6.44 N 15.99
Found    C 65.75 H 6.42 N 16.07

8-Chloro-2-(2-morpholinoethyl)-6-phenyl-2,4-dihydro-1H-s-triazolo[4,3-a][1,4]benzodiazepin-1-one;

Colorless needles from acetone
Melting point 163–164°C
Elementary analysis
Calculated for $C_{22}H_{22}ClN_5O_2$
    C 62.33 H 5.23 N 16.52
Found    C 62.36 H 5.10 N 16.58

8-Chloro-6-phenyl-2-(2-piperidinoethyl)-2,4-dihydro-1H-s-triazolo[4,3-a][1,4]benzodiazepin-1-one;

Colorless needles from acetone
Melting point 169.5–170.5°C
Elementary analysis
Calculated for $C_{23}H_{24}ClN_5O$
    C 65.47 H 5.73 N 16.60
Found    C 65.28 H 5.73 N 16.64

8-Chloro-2-(2-dimethylaminoethyl)-6-(4-methoxyphenyl)-2,4-dihydro-1H-s-triazolo[4,3-a][1,4]benzodiazepin-1-one (oxalic acid salt);

Pale yellow fine needles from methanol
Melting point 203–204°C (effervescence)
Elementary analysis
Calculated for $C_{21}H_{22}ClN_5O_2 \cdot 3/2(COOH)_2$
C 52.70 H 4.61 N 12.81
Found C 52.46 H 4.51 N 12.94

2-(2-Morpholinoethyl)-6-phenyl-2,4-dihydro-1H-s-triazolo-[4,3-a][1,4]benzodiazepin-1-one (dihydrochloride);

Colorless powdery crystals from ethanol-ether
Melting point 184–187°C
Elementary analysis
Calculated for $C_{22}H_{23}N_5O_2 \cdot 2HCl$
C 57.14 H 5.45 N 15.14
Found C 56.90 H 5.78 N 15.39

8-Methyl-2-(2-morpholinoethyl)-6-phenyl-2,4-dihydro-1H-s-triazolo[4,3-a][1,4]benzodiazepin-1-one;

Colorless needles from acetone
Melting point 192.5–194°C
Elementary analysis
Calculated for $C_{23}H_{25}N_5O_2$  C 68.46 H 6.25 N 17.36
Found C 68.25 H 6.28 N 17.33

8-Chloro-2-(2-diethylaminoethyl)-6-phenyl-2,4-dihydro-1H-s-triazolo[4,3-a][1,4]benzodiazepin-1-one 5N-oxide;

Colorless prisms from aqueous acetone
Melting point 94–95°C
Elementary analysis
Calculated for $C_{22}H_{24}ClN_5O_2$
C 62.03 H 5.68 N 16.44
Found C 61.90 H 5.48 N 16.38

8-Chloro-6-(4-chlorophenyl)-2-(2-diethylaminoethyl)-2,4-dihydro-1H-s-triazolo[4,3-a][1,4]benzodiazepin-1-one 5N-oxide;

Colorless prisms from aqueous acetone
Melting point 92–94°C
Elementary analysis
Calculated for $C_{22}H_{23}Cl_2N_5O_2 \cdot 2/3H_2O$
C 55.93 H 5.19 N 14.82
Found C 55.93 H 5.01 N 14.90

8-Chloro-6-(4-chlorophenyl)-2-(2-morpholinoethyl)-2,4-dihydro-1H-s-triazolo[4,3-a][1,4]benzodiazepin-1-one 5N-oxide;

Colorless powdery crystals from aqueous methanol
Melting point 149–150°C
Elementary analysis
Calculated for $C_{22}H_{21}Cl_2N_5O_3 \cdot \frac{1}{2}H_2O$
C 54.72 H 4.59 N 14.50
Found C 54.47 H 4.21 N 14.59

2-(2-Dimethylaminoethyl)-8-nitro-6-phenyl-2,4-dihydro-1H-s-triazolo[4,3-a][1,4]benzodiazepin-1-one 5N-oxide;

Pale yellow plates from ethyl acetate
Melting point 206–207°C
Elementary analysis
Calculated for $C_{20}H_{20}N_6O_4$  C 58.81 H 4.94 N 20.58
Found C 58.93 H 4.94 N 20.57

2-(2-Dimethylaminoethyl)-6-phenyl-8-trifluoromethyl-2,4-dihydro-1H-s-triazolo[4,3-a][1,4]benzodiazepin-1-one 5N-oxide;

Colorless fine plates from acetone - isopropyl ether
Melting point 169–170°C
Elementary analysis
Calculated for $C_{21}H_{20}F_3N_5O_2$
C 58.46 H 4.67 N 16.24
Found C 58.63 H 4.56 N 16.39

What is claimed is:
1. A member selected from the group consisting of (A) a compound of the formula

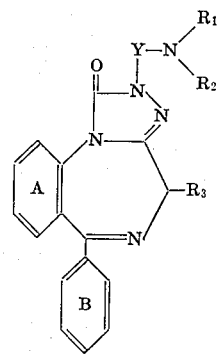

wherein Y represents alkylene having up to six carbons, $R_1$ represents hydrogen or lower alkyl, $R_2$ represents lower alkyl, or $R_1$ and $R_2$, together with the adjacent nitrogen, form a five or six membered ring selected from the group consisting of pyrrolidine, piperidine, morpholine, piperazine and N-lower alkyl piperazine, $R_3$ represents hydrogen or alkyl having up to six carbons and each of the rings A and B is unsubstituted or has one or more substituents selected from the group consisting of nitro, trifluoromethyl, halogen, lower alkyl and lower alkoxy, (B) a five-position N-oxide thereof and (C) a pharmaceutically acceptable acid salt thereof.

2. A compound according to claim 1, wherein Y represents alkylene having two or three carbons, $R_1$ represents hydrogen, methyl or ethyl and $R_2$ represents methyl or ethyl, or $R_1$ and $R_2$, together with the adjacent nitrogen, form the morpholine ring.

3. A compound as claimed in claim 1, wherein the compound is 8-chloro-2-(2-dimethylaminoethyl)-6-phenyl-2,4-dihydro-1H-s-triazolo[4,3-a][1,4]benzodiazepin-1-one.

4. A compound as claimed in claim 1, wherein the compound is 8-chloro-2-(3-dimethylaminopropyl)-6-phenyl-2,4-dihydro-1H-s-triazolo[4,3-a][1,4]benzodiazepin-1-one.

5. A compound as claimed in claim 1, wherein the compound is 8-chloro-2-(2-diisopropylaminoethyl)-6-phenyl-2,4-dihydro-1H-s-triazolo[4,3-a][1,4]benzodiazepin-1-one.

6. A compound as claimed in claim 1, wherein the compound is 8-chloro-2-(2-morpholinoethyl)-6-phenyl-2,4-dihydro-1H-s-triazolo[4,3-a][1,4]benzodiazepin-1-one.

7. A compound as claimed in claim 1, wherein the compound is 8-chloro-6-phenyl-2-(2-piperidinoethyl)-

8. A compound as claimed in claim 1, wherein the compound is 8-chloro-2-(2-dimethylaminoethyl)-6-(4-methoxyphenyl)-2,4-dihydro-1H-s-triazolo[4,3-a][1,4]benzodiazepin-1-one.

9. A compound as claimed in claim 1, wherein the compound is 2-(2-morpholinoethyl)-6-phenyl-2,4-dihydro-1H-s-triazolo-[4,3-a][1,4]benzodiazepin-1-one.

10. A compound as claimed in claim 1, wherein the compound is 8-methyl-2-(2-morpholinoethyl)-6-phenyl-2,4-dihydro-1H-s-triazolo[4,3-a][1,4]benzodiazepin-1-one.

11. A compound as claimed in claim 1, wherein the compound is 8-chloro-2-(2-diethylaminoethyl)-6-phenyl-2,4-dihydro-1H-s-triazolo[4,3-a][1,4]benzodiazepin-1-one 5N-oxide.

12. A compound as claimed in claim 1, wherein the compound is 8-chloro-6-(4-chlorophenyl)-2-(2-diethylaminoethyl)-2,4-dihydro-1H-s-triazolo[4,3-a][1,4]benzodiazepin-1-one 5N-oxide.

13. A compound as claimed in claim 1, wherein the compound is 8-chloro-6-(4-chlorophenyl)-2-(2-morpholinoethyl)-2,4-dihydro-1H-s-triazolo[4,3-a][1,4]benzodiazepin-1-one 5N-oxide.

14. A compound as claimed in claim 1, wherein the compound is 2-(2-dimethylaminoethyl)-8-nitro-6-phenyl-2,4-dihydro-1H-s-triazolo[4,3-a][1,4]benzodiazepin-1-one 5N-oxide.

15. A compound as claimed in claim 1, wherein the compound is 2-(2-dimethylaminoethyl)-6-phenyl-8-trifluoromethyl-2,4-dihydro-1H-s-triazolo[4,3-a][1,4]benzodiazepin-1-one 5N-oxide.

* * * * *